Figure 1:
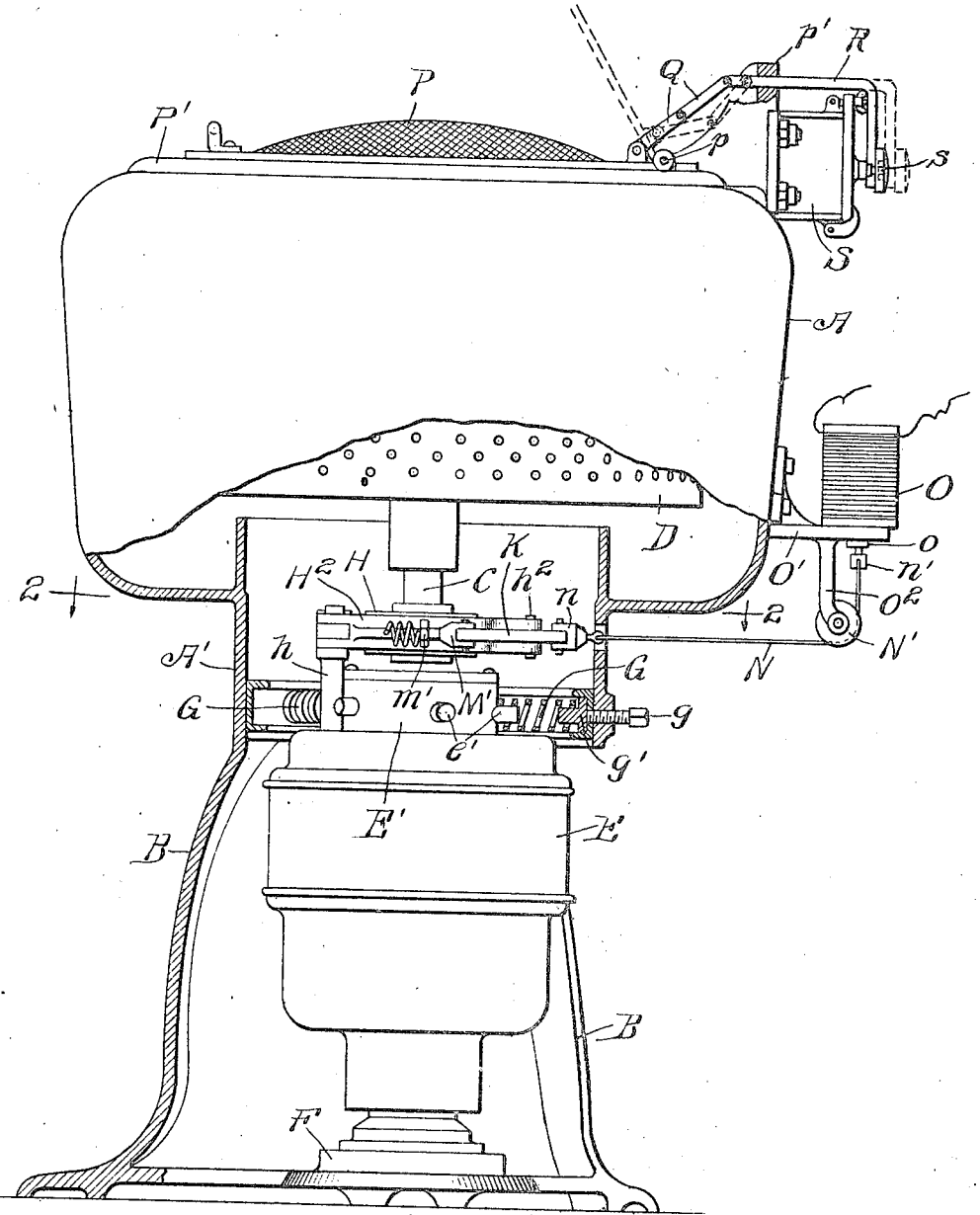

F. BALZER.
ELECTRICALLY CONTROLLED CENTRIFUGAL EXTRACTOR.
APPLICATION FILED APR. 29, 1912.

1,236,529.

Patented Aug. 14, 1917.
2 SHEETS—SHEET 1.

Witnesses:
Harry S. Gaither
Edythe M. Anderson

Inventor:
Fritz Balzer
by Sheridan, Wilkinson,
Scott & Richmond
Attys.

F. BALZER.
ELECTRICALLY CONTROLLED CENTRIFUGAL EXTRACTOR.
APPLICATION FILED APR. 29, 1912.
Patented Aug. 14, 1917.
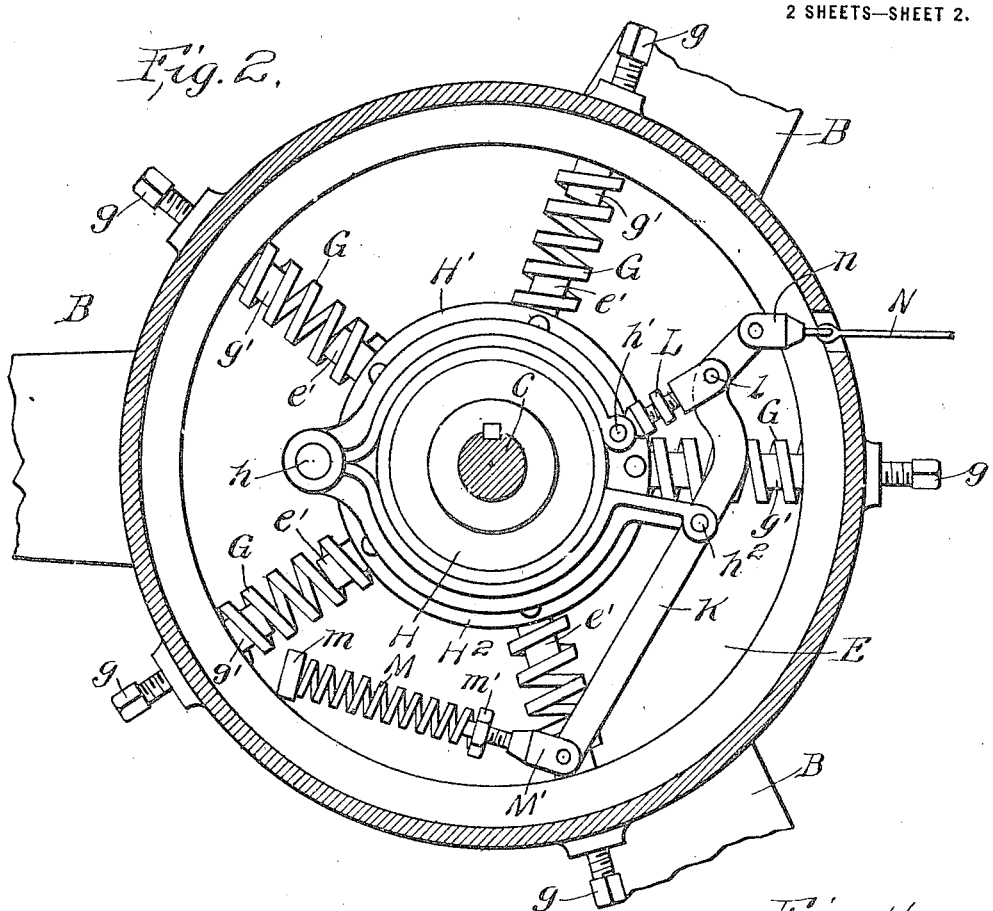
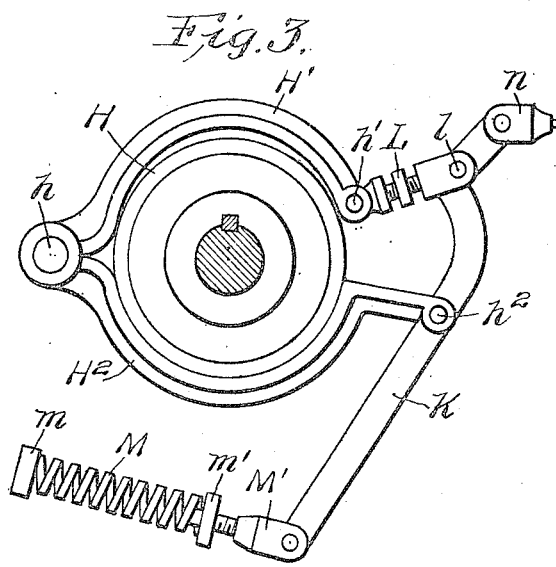
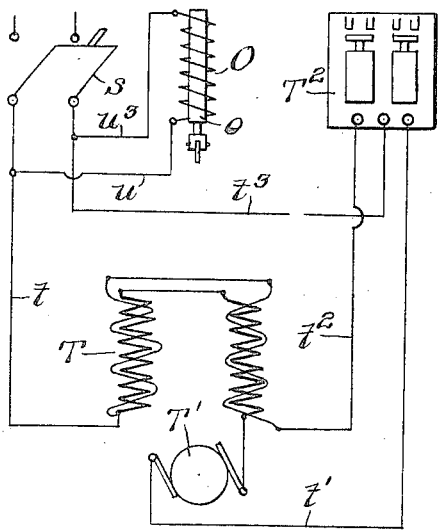
Witnesses:
Harry S. Gaither
Edythe M. Anderson
Inventor:
Fritz Balzer
by Sheridan, Wilkinson, Scott & Richmond
Attys.

UNITED STATES PATENT OFFICE.

FRITZ BALZER, OF CHICAGO, ILLINOIS, ASSIGNOR TO TROY LAUNDRY MACHINERY COMPANY, LTD., OF CHICAGO, ILLINOIS, A CORPORATION OF NEW YORK.

ELECTRICALLY-CONTROLLED CENTRIFUGAL EXTRACTOR.

1,236,529.   Specification of Letters Patent.   Patented Aug. 14, 1917.

Application filed April 29, 1912. Serial No. 693,989.

*To all whom it may concern:*

Be it known that I, FRITZ BALZER, a subject of the Emperor of Germany, residing at Chicago, in the county of Cook and State of Illinois, have invented certain new and useful Improvements in Electrically-Controlled Centrifugal Extractors, of which the following is a specification.

My invention relates in general to centrifugal machines, and more particularly to means for electrically rotating and stopping the rotation of the baskets of centrifugal extractors.

It is desirable that the rotating member of a power driven centrifugal machine should be quickly stopped when the power is disconnected in order that the articles which have been treated may be removed and other articles placed therein without loss of time to the operator. It is further desirable that the rotating member should be automatically stopped when the power is disconnected to avoid danger of injury to the operator which would result should he place his hands into the rotating member before its rotation ceased.

The primary object of my invention is to provide an electrically driven centrifugal machine having an electric brake which will be automatically operated to retard the rotation of the rotating member of the machine when the current to the driving motor is disconnected, and which will be automatically disengaged from the rotating member when the circuit is closed to the motor.

A further object of my invention is to provide an electrically driven centrifugal extractor, in which the raising of the cover of the basket will disconnect the current from the motor and will automatically effect the application of a brake to stop the rotation of the basket, and in which the closing of the cover will close the circuit to the driving motor and simultaneously release the brake.

A still further object of my invention is to provide an electrically operated centrifugal machine, which will be efficient in operation, simple in construction, and free from danger to the operator.

My invention will be more fully disclosed hereinafter with reference to the accompanying drawings, in which the same is illustrated as embodied in a convenient and practical form, in which—

Figure 1 is an elevational view, parts being broken away;

Fig. 2, an enlarged sectional view on line 2 2, Fig. 1;

Fig. 3, a plan view of the brake in release position; and

Fig. 4, a diagram of the electrical circuits.

The same reference characters are used to designate the same parts in the several figures of the drawings.

Reference character A designates a casing or curb which is mounted upon a suitable support, such, for instance, as legs B. C designates a vertical spindle upon the upper end of which is secured a perforated basket D located within the casing A. E indicates the motor casing concentrically surrounding the spindle C and within which is inclosed the electric motor for rotating the shaft and with it the basket D. F designates a stationary support upon which the lower end of the motor casing E bears.

A plurality of radial springs G are interposed between the circular flange E' on the upper end of the motor casing and the surrounding cylindrical portion A' of the support of the curb A. The inner end of each spring G surrounds a stud $e'$ projecting outwardly from the flange E', while the outer end of each spring surrounds a stud $g'$ which is radially adjustable by means of a set screw $g$, extending through a screw threaded opening in the surrounding cylindrical member A'. The radial springs G and the support F normally retain the motor casing and with it the spindle C in a vertical position, but permit lateral yielding of the motor casing, the inclosed motor and spindle during the rotation of the basket.

Fixed upon the spindle C, preferably above the motor casing A, is a brake disk H which is adapted to be frictionally engaged by two semi-circular shoes H' and H² which are pivotally mounted at adjacent ends upon a post $h$ projecting upwardly from the motor casing A. The free end of the brake shoe H² is pivotally connected at $h^2$ to a lever K which is also pivotally connected to the free end of the brake shoe H' through an adjustable coupling L. The coupling L may conveniently comprise a right and left screw threaded bolt, one end of which engages a nut pivotally connected at $h'$ to the free end of the brake shoe H', while its other end engages a nut pivotally connected at $l$ to the lever K. One end of the lever K is pivotally connected to a clevis M' provided with a screw threaded extension which is engaged by a nut $m'$. A spring M is interposed between the nut $m'$ and a bracket $m$ fixed upon the upper surface of the motor casing E. The opposite end of the brake lever K is pivotally connected to a clevis $n$ to which is secured a cable or other flexible connection N. The cable N passes around the guide pulley N' and is then connected at $n'$ to the lower end of the core $o$ of a solenoid O. The solenoid may be conveniently supported upon the bracket O' secured to the casing A, which bracket may be provided with an extension $O^2$ upon which is journaled the guide pulley N'.

P designates a cover for closing the casing A, which is hinged at $p$ to the ring P', the latter being secured around the opening at the top of the casing A and provided with a water-guard $p'$.

The cover P is pivotally connected at a point adjacent its hinge to a pair of links Q which are also connected to a reciprocating rod R extending through the water-guard $p'$ and operatively connected at $s$ to an electrical switch inclosed within the switch casing S. The switch casing S may be conveniently secured to the outer surface of the water-guard $p'$.

The operation of my improvements is as follows, attention being directed to the diagram shown in Fig. 4. When the cover P is closed, the links Q draw the rod R toward the left, thereby actuating the switch to close the circuit from a suitable source of electricity, to the motor and solenoid. If desired, a suitable automatic starter $T^2$ may also be included in the circuit. When the switch is closed, the field T and armature T' of the motor are connected by the leads $t$, $t'$ and $t^2$ with the automatic starter $T^2$ and by the lead $t^3$ with the switch. The winding of the solenoid O is simultaneously energized by means of the leads $u$ and $u^3$. The spindle C is consequently rotated by the motor and such rotation is communicated to the basket D, while at the same time the energization of the solenoid causes the core $o$ to move upwardly, thereby exerting a pull on the cable N and oscillating the brake lever K against the tension of the spring M. The brake shoes are thereby swung apart and disengaged from the brake disk H.

When the cover P is open the links Q force the rod R toward the right until they engage the inner surface of the water-guard $p'$, when the links break, as shown in dotted lines in Fig. 1. This movement of the rod R operates the switch $s$ to disconnect the source of energy, both from the motor and solenoid. The spring M consequently oscillates the brake lever K and forces the shoes H'' and $H^2$ toward each other into frictional engagement with the brake disk H, thereby stopping the rotation of the shaft and with it the basket D.

From the foregoing description it will be observed that by my improvements the brake is automatically applied when the current is disconnected from the motor, thereby insuring the prompt stopping of the basket so that the articles which have been treated may be removed therefrom and other articles placed therein without loss of time. It will also be observed that when the current is closed to the motor the brake will be automatically released so as to permit the shaft and basket to be driven by the motor.

It will be further observed that in the specific application of my invention herein disclosed the lifting of the cover of the centrifugal extractor simultaneously effects the interruption of the current to the motor and the application of the brake so as to stop the rotation of the basket immediately upon the cover being raised and thereby avoid danger to the operator. The closing of the cover automatically closes the circuit to the motor and to the solenoid, so that the brake will be released and the current supplied to the motor.

While I have described more or less in detail the specific form in which I have illustrated my invention as embodied, yet I do not wish to be understood as limiting myself thereto, as I contemplate changes in form, proportion of parts, and substitution of equivalents, as circumstances may require, or as may be deemed expedient.

I claim:

1. In a centrifugal extractor, the combination with a casing, of a rotary basket inclosed by said casing, a cover for said casing, a spindle upon which said basket is supported, an electric motor for rotating said spindle, a brake for stopping the rotation of said spindle, a solenoid the core of which is operatively connected with said brake to release the same, a spring for automatically applying said brake upon the discontinuance of the current through said solenoid, an electric switch for simultaneously controlling the circuits to said motor and solenoid, and means connecting said cover with said switch for actuating the switch when the cover is closed to close the motor and solenoid circuits and for actuating said switch when the cover is open to open said circuits, whereby the rotation of said basket will be stopped when said cover is opened.

2. In a centrifugal extractor, the combination with a casing, of a rotary basket inclosed by said casing, a cover for said casing, a spindle upon which said basket is supported, an electric motor concentrically surrounding said spindle for rotating the same, a brake disk fixed to said spindle, brake shoes adapted to frictionally engage said brake disk, a spring for forcing said shoes into contact with said disk, a solenoid mounted upon said casing having a core which is operatively connected with said brake shoes to release them from contact with said disk, an electric switch supported upon said casing for simultaneously controlling the circuits to said motor and solenoid, and means connecting said cover with said switch for actuating said switch to close the motor and solenoid circuits when said cover is closed and for actuating said switch to open said circuits when said cover is open.

3. In a centrifugal machine, the combination with a rotating member, of a protecting guard for said member, a driven spindle upon which said member is supported, an electric motor for driving said spindle, a brake disk fixed to said spindle, a shoe adapted to frictionally engage said disk, a spring for engaging said shoe with said disk, a solenoid operatively connected to said shoe for disengaging the same from said brake disk, and means controlled by said guard for simultaneously closing or simultaneously interrupting the circuit to said motor and solenoid.

4. In a centrifugal extractor, the combination with a rotating basket, of an electric motor for driving said basket, a casing in which said basket is located, a cover for said casing, an electric motor for driving said basket, an electrically controlled brake for retarding the rotation of said basket, and means controlled by said cover for closing the circuit to said motor and simultaneously releasing said brake and for interrupting the circuit to said motor and simultaneously applying said brake.

5. In a centrifugal extractor, the combination with a rotating basket, of a casing surrounding said basket, a cover for said casing, an electric motor for rotating said basket, a brake for retarding the rotation of said basket, a solenoid for releasing said brake, a spring for applying said brake, and means controlled by said cover for simultaneously closing and for simultaneously interrupting the circuit to said motor and solenoid.

6. In a centrifugal extractor, the combination with a rotating basket, of a spindle upon which said basket is supported, a casing in which said basket is inclosed, a cover for said casing, an electric motor for rotating said spindle, a brake for retarding the rotation of said spindle, and means actuated by said cover for simultaneously closing the circuit to said motor and releasing said brake, and for simultaneously interrupting the current to said motor and applying said brake.

7. In a centrifugal extractor, the combination with a rotating basket, of a spindle upon which said basket is mounted, a casing inclosing said basket, a cover for said casing, an electric motor for rotating said spindle, a brake for retarding the rotation of said spindle, a solenoid for releasing said brake, a spring for applying said brake, and means controlled by the opening of said cover for interrupting the circuit to said motor and solenoid, and controlled by the closing of said cover to close the circuit to said motor and solenoid.

In testimony whereof I have subscribed my name.

FRITZ BALZER.

Witnesses:
GEO. L. WILKINSON,
HENRY A. PARKS.